Patented July 31, 1951

2,562,528

UNITED STATES PATENT OFFICE 2,562,528

COLOR FORMER ACETALS OF POLYVINYL ALCOHOL AND SUBSTITUTED CARBALKOXYACETAMIDOBENZALDEHYDES

James Oliver Corner, Wilmington, Del., assignor to E. I. du Pont de Nemours & Company, Wilmington, Del., a corporation of Delaware No Drawing. Application January 21, 1949, Serial No. 72,051

5 Claims. (Cl. 260—73)

This invention relates to new acetals of hydroxyl polymers containing a plurality of recurring intralinear vinyl alcohol groups and more particularly to color-former acetals of polyvinyl alcohol and lower alkyl- and alkoxy-substituted-3-carbalkoxyacetamidobenzaldehydes.

An object of this invention is to provide a new class of polyvinyl acetal color formers. A further object is to provide such acetals which are useful in processes of three color photography. A still further object is to provide such acetals giving improved color balance and fidelity of reproduction in three color photography. Still other objects will be apparent from the following description of the invention.

The new compounds of this invention are polyvinyl acetals in which between 1% and 7% of the hydroxyl groups of polyvinyl alcohol are acetalized with an alkyl- or alkoxy-substituted carbalkoxyacetamidobenzaldehyde of the formula:

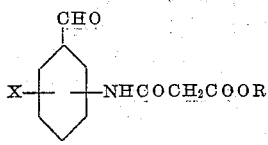

(1)

wherein R is an alkyl group of 1 to 4 carbon atoms and X is an alkyl or alkoxy group of 1 to 4 carbon atoms. These new polymeric color formers thus contain the recurring units:

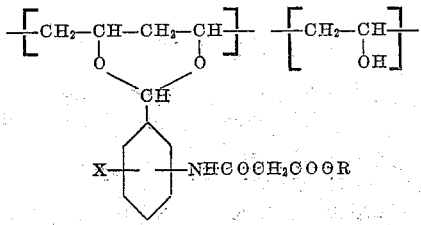

(2)

where R and X have the significance given above and where the free bonds are attached to intralinear carbon atoms in the chain of carbon atoms which formed the original vinyl alcohol polymer.

The preferred polyvinyl acetals of this invention contain the recurring units:

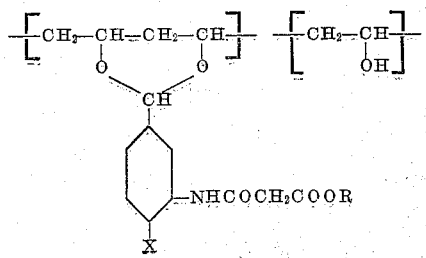

wherein R and X have the same significance as in Formulae 1 and 2 and the free bonds are linked as stated in the previous paragraph.

The polyvinyl acetals of this invention can be prepared by reacting a vinyl alcohol polymer containing a large number of recurring intralinear

groups with a lower alkyl- or lower alkoxy-substituted carbalkoxyacetamidobenzaldehyde or lower acetal thereof with an alkanol of one to four carbon atoms or a 1,2-alkanediol or 1,2- or 1,3-glycol of two to four carbon atoms under acetal-forming conditions, e. g., in the presence of an acidic condensation catalyst. The alkanols include methyl, ethyl, propyl and butyl alcohols. The 1,2- and 1,3-alkanediols include ethylene glycol, 1,2- and 1,3-dihydroxy propane, 1,2- and 1,3-dihydroxy-butane.

The lower alkyl- or alkoxy-substituted carbalkoxyacetamidobenzaldehyde acetals used as reactants for making the polyvinyl acetals can be prepared by reacting a carbalkoxyacetyl chloride, e. g., carbomethoxy- or carbethoxyacetyl chloride with a lower acetal, e. g., an ethylene glycol acetal of a lower alkyl- or lower alkoxy-substituted o-, m- or p-aminobenzaldehyde, preferably the m-aminobenzaldehyde, in an inert water-miscible organic solvent, e. g., acetone, under conditions of external cooling. When the reaction is complete the lower alkyl- or alkoxy-substituted carbalkoxyacetamidobenzaldehyde ethylene glycol acetal is precipitated as a solid by the addition of a large amount of cold water. The product is then washed and recrystallized from a suitable solvent, e. g. ethanol. If the free aldehyde is desired this can be formed from the acetal by acidic hydrolysis.

The acetal interchange reaction, whereby the novel polymeric acetals of this invention are prepared, may be carried out as follows: A suspension is made of a synthetic hydroxyl polymer having a plurality of recurring intralinear

groups, e. g., polyvinyl alcohol or a partially hydrolyzed polyvinyl ester, and a lower alkyl- or alkoxy-substituted -o-, m-, or -p-carbalkoxyacetamidobenzaldehyde or an acetal thereof with alkanol of one to four carbon atoms or a 1,2- or 1,3-alkanediol of two to four carbon atoms in ethylene glycol or other suitable solvent, e. g., ethanol or methanol, having dissolved therein a small portion of an acidic catalyst. This suspension is heated with agitation at 60° C. to 80° C. for a period of 0.5 to 25 hours and the resulting polyvinyl acetal is isolated. Isolation of the color-forming polymeric acetal is accomplished by the addition of an ethylene glycol miscible solvent which is not a solvent for the polymeric acetal, followed by filtration and, if desired, by washing with an ethylene glycol miscible solvent which is not a solvent for the polymeric acetal. Suitable solvents of this type include acetone, methyl ethyl ketone, methanol and ethanol and mixtures of two or more of such solvents.

In a practical specific procedure, a suspension of 15 parts of polyvinyl alcohol or a partially hydrolyzed polyvinyl ester and one to six parts of the alkyl- or alkoxy-substituted -m-carbalkoxyacetamidobenzaldehyde or its ethylene glycol acetal in 100 parts of ethylene glycol containing one to two parts of phosphoric acid is heated with agitation at 65° C. to 75° C. for 0.5 to 5 hours. The reaction mixture is cooled to 40° C. to 50° C. and 100 to 200 parts of methanol or acetone are added. The resulting polyvinyl acetal color former is separated and slurried with methanol or acetone to free the polymer from the ethylene glycol and to remove traces of unreacted monomeric color former.

In order to obtain a polyvinyl acetal of improved quality whose color and solubility do not change on standing, it is desirable to treat the slurry of the polyvinyl acetal color former with a compound capable of neutralizing the acid catalyst. Suitable compounds for this process include alkali or alkaline earth metal bicarbonates and carbonates; tertiary amines such as triethylamine, triethanolamine, diethylaniline, etc., and heterocyclic bases, such as quinoline, pyridine, etc. The quantity of neutralizing agent added to the suspension should be sufficient to bring the pH to a value of about 6 to 8, preferably 7.5. The acid neutralizing compound may be dissolved in the solvent used during the dilution of the ethylene glycol reaction mixture, or may be added during any of the subsequent slurrying steps.

The use of ethylene glycol as a reaction medium in the manufacture of polyvinyl acetal color formers is disclosed and claimed in Martin United States application Serial No. 722,961, filed January 18, 1947, now U. S. Patent 2,513,189.

The invention will be further illustrated but is not to be limited by the following examples. The parts are by weight.

EXAMPLE I

*4-methoxy-3-carbethoxyacetamidobenzaldehyde ethylene glycol acetal*

A solution of 200 parts of 4-methoxy-3-aminobenzaldehyde ethylene glycol acetal (prepared as described in Example IV of McQueen and Woodward, U. S. application Serial No. 719,110, filed December 28, 1946 now U. S. Patent 2,481,434), 310 parts of acetone, 145 parts of anhydrous potassium carbonate and 400 parts of ice water is cooled to 0° C. To this is added dropwise a solution of 162 parts of carbethoxyacetal chloride (prepared as described by Hauser, Breslow and Baumgarten, J. Am. Chem. Soc., vol. 66, page 1286 (1944)) in 128 parts of dry acetone, keeping the temperature between 0° C. and 5° C. by means of external cooling. The mixture is stirred for 30 minutes after all the acid chloride is added. One thousand parts of cold water is then added and the solid product is collected on a filter. It is washed successively with 10% aqueous acetone, 5% aqueous acetone and water and dried in air. The yield is 260 to 270 parts of nearly white solid. After recrystallization from ethanol 4 - methoxy - 3 - carbethoxyacetamidobenzaldehyde ethylene glycol acetal is recovered as a white crystalline material having a melting point of 78.5 to 79.5° C. Analysis calculated for $C_{15}H_{19}O_6N$ : N, 4.5. Found N, 4.2.

*Polyvinyl acetal of 4-methoxy-3-carbethoxyacetamidobenzaldehyde*

To a solution of 63 parts of 4-methoxy-3-carbethoxyacetamidobenzaldehyde ethylene glycol acetal, 6 parts of o-sulfobenzaldehyde sodium salt, 2000 parts of ethylene glycol and 30 parts of 85% phosphoric acid is added 300 parts of dry polyvinyl alcohol. This polymer is a completely hydrolyzed polyvinyl acetate and has a 4% aqueous solution viscosity of 20 to 30 centipoises at 20° C.). The slurry is stirred while heating at 65° C. for one hour. It is then cooled at 50° C. and diluted with 1400 parts of acetone. The 4 - methoxy-3-carbethoxyacetamidobenzaldehyde polyvinyl acetal is collected on a filter and washed with a little acetone. It is then slurried in methanol and a solution of triethylamine in methanol is added until the pH is about 8. After stirring 15 minutes the polyvinyl acetal is collected and washed with methanol, then reslurried in fresh methanol, filtered and slurried twice in acetone. After drying a 40° C. the product weighs 355 parts and is pure white. The product is a polyvinyl acetal color former containing recurring

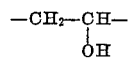

groups and, as determined by ultraviolet absorption, 14% by weight of the following grouping:

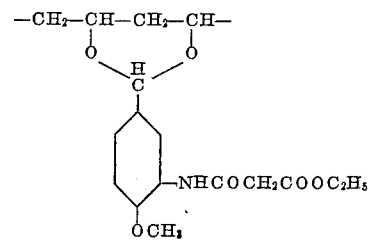

EXAMPLE II

*4-methyl-3carbethoxyacetamidobenzaldehyde ethylene glycol acetal*

The process conditions and compounds in amounts identical with paragraph one of Example I are used except that 184 parts of 4-methyl-3-aminobenzaldehyde ethylene glycol acetal (prepared as described in U. S. Patent 2,481,434 Example V) is substituted for 4-methoxy-3-aminobenzaldehyde ethylene glycol acetal. The yield of 4 - methyl - 3 - carbethoxyacetamidobenzaldehyde ethylene glycol acetal is 250 parts of white solid. Recrystallization from ethanol gives 4-methyl-3-carbethoxyacetamidobenzaldehyde ethylene glycol acetal in the form of hairlike needles, M. P. 93–94° C.

Sixty parts of 4-methyl-3-carbethoxyacetamidobenzaldehyde ethylene glycol acetal is used in place of the 4-methoxy-3-carbethoxyacetamidobenzaldehyde ethylene glycol acetal described in the last paragraph of Example I and the reaction carried out in the same manner. The yield is 350 parts of 4-methyl-3-carbethoxyacetamidobenzaldehyde polyvinyl acetal in the form of a white solid.

EXAMPLE III

A photographic element comprising a transparent support and a light-sensitive silver halide layer utilizing as the colloid binding medium the hydrophilic polyvinyl acetal color-former prepared as described under Example I was exposed and developed for ten minutes in a color developer of the composition:

| | | |
|---|---|---|
| p - Amino - N,N - diethylaniline hydrochloride | grams | 2.5 |
| Sodium carbonate (anhydrous) | do | 25.0 |
| Sodium sulfite (anhydrous) | do | 10.0 |
| Potassium bromide | do | 2.5 |
| Water to | liter | 1.0 |

After washing, bleaching, fixing, and washing again the element was bathed in a diazonium salt solution prepared as follows:

To 20 cc. of 10% aqueous sodium hydroxide, 8.7 grams of sulfanilic acid was added. The mixture was stirred until solution was complete and then cooled to 5° C. and acidified with 13.5 cc. of concentrated hydrochloric acid. Stirring was maintained in order to secure fine particles of the amine hydrochloride. Cracked ice was added to the mixture so as to maintain a temperature of 0° to 5° C. and a solution of 3.5 grams of sodium nitrite in 10 cc. of water was added with continuous stirring. After standing one-half hour, water and cracked ice were added to make the total volume up to about 500 cc. Solid sodium acetate was added until disappearance of a positive test for hydrochloric acid with Congo red test paper. The pH of the solution was about 5.0. The entire solution was filtered and diluted to 1 liter.

The washed film strip was bathed for five minutes in a 12.5 cc. portion of the diazo solution which had been diluted to 100 cc. No color was produced in the non-image areas so that the original contrast of the positive image was unaltered.

In comparison, when the same series of operations was performed on a similar element but utilizing a polyvinyl acetal color former containing color-forming nuclei or units of the structure:

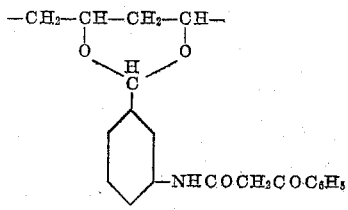

i. e., a structure not containing a carbalkoxyacetamido group, the diazonium solution produced a small, but definite, amount of pale yellow dye. The latter polyvinyl acetal color-former is described in McQueen U. S. application Serial No. 9,330, filed February 18, 1948, now U. S. patent number 2,513,990. This new image was formed to an extent inversely proportional to the amount of original image in every area and therefore had a contrast opposite in sign to that of the original color-developed image. The image gamma was thereby reduced markedly.

EXAMPLE IV

A multilayer film was prepared having the following strata in order on a transparent support.

1. A silver halide emulsion layer for color-development of a cyan image, sensitized for red light, utilizing as the colloid binding medium a hydrophilic polyvinyl acetal color-former containing groupings of the structure:

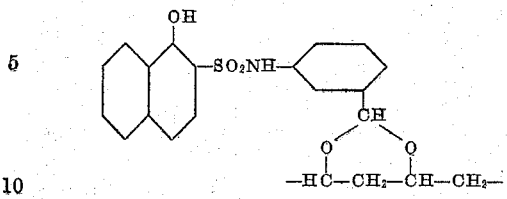

obtained as described in U. S. Patent 2,423,572.

2. A thin colorless separator layer of a hydrophilic hydrolyzed ethylene/vinyl acetate interpolymer.

3. A silver halide emulsion layer for color development of a magenta image, sensitized for green light, which utilizes as the colloid binding medium a polyvinyl acetal color-former containing groupings of the structure:

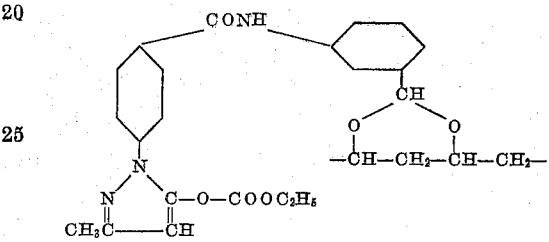

prepared as described in Example I in Martin U. S. application Serial No. 682,137, filed July 8, 1946.

4. A separator layer like layer 2.

5. An emulsion layer for color development of yellow like that of Example I and containing a yellow filter dye e. g., Tartrazine (Colour Index No. 640).

The multilayer film element was exposed to a graduated step tablet through three red, green and blue primary filters and was processed as in Example III. A multicolor negative image was produced with superimposed yellow and orange masks, resulting from diazo coupling on the uncoupled magenta and cyan color-formers, respectively.

A similar element was prepared in which layer 5 contained as the color-forming silver halide binder a polyvinyl acetal having groupings of the structure:

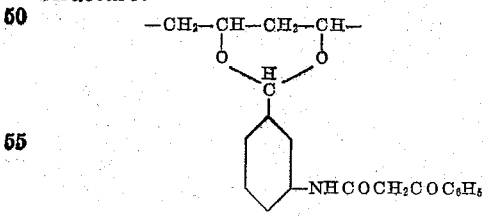

i. e., groupings not containing carbalkoxyacetamido groups. This element was exposed and processed in the same fashion as the other multilayer element. The two processed negatives were then printed directly onto a multilayer element of the same construction. The color temperature of the printing source and the duration of the printing exposure were adjusted in each case so as to produce equal, neutral densities, from corresponding highlight areas in the two reproductions. Marked improvement in the reproduction of the original image was apparent in the case of the print from the negative employing the yellow color-forming polymer of Example I. In addition, the printing time using as a negative a film containing the yellow color-forming polymer of Example I was much shorter than that necessary when a negative containing the benzoylacetamido yellow color-former was used. This is accounted for by the fact that in the latter case there is a strong filtering action by the unwanted yellow dye.

Other polyvinyl acetals of this invention can be obtained by substituting equivalent amounts of the following compounds for the ethylene glycol acetals of the examples:

4-ethoxy - 3 - carbethoxyacetamidobenzaldehyde ethylene glycol acetal
4-butoxy - 3 - carbethoxyacetamidobenzaldehyde ethylene glycol acetal
4 - ethyl - 3 - carbethoxyacetamidobenzaldehyde ethylene glycol acetal
4-tertiary-butyl - 3-carbethoxyacetamidobenzaldehyde ethylene glycol acetal
4-methoxy - 3-carbomethoxyacetamidobenzaldehyde ethylene glycol acetal
4-methoxy-3-carbo-n-butoxyacetamidobenzaldehyde ethylene glycol acetal The polyvinyl acetals of the lower alkyl- or alkoxy-substituted -3-carbalkoxyacetamidobenzaldehydes described above are useful as dispersing and protective colloid binding agents for light-sensitive silver salts in single or multilayer color films. Color development of an exposed coated film with a primary aromatic color-developing agent, e. g., p-aminodiethylaniline gives a strong, brilliant yellow dye image.

When used as a yellow color former in a gelatin-free multilayer color film, polyvinyl acetals of lower alkyl- or lower alkoxy-substituted carbalkoxyacetamidobenzaldehyde containing between 5% and 20% by weight of the color-forming nucleus of Example I based on the total weight of color-forming polymer are most useful. This corresponds to having the acetal groups on from 1.3% to 6.2% of the hydroxyls of the polyvinyl alcohol. In general, the polymeric color-formers of this invention have between 1% and 7% of the hydroxyl groups of the polyvinyl alcohol acetalized by the alkyl- or alkoxy-substituted carbalkoxy acetamidobenzaldehyde. When polymers having lower degrees of substitution are used, the colors formed by color development are weak. When polymers having a higher degree of substitution are used, there is difficulty in obtaining good solutions and in redispersing the emulsion after washing.

In order to achieve more satisfactory water sensitivity for processing when coated on a suitable film base, the color-forming polyvinyl acetals can also contain a number of polymeric units wherein the hydroxyls of the polyvinyl alcohol are acetalized with an aromatic aldehyde containing a carboxylic or sulfonic acid group or the alkali metal salt thereof, such aldehydoacid having the formula

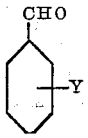

wherein Y is COOH or SO₃H or an alkali metal salt thereof. These solubilizing aldehydes include, for example, orthosulfobenzaldehyde, phthalaldehydic acid and the like or their alkali metal salts. Polymeric acetals having from 0.2 to 5% of the hydroxyls of polyvinyl alcohol acetalized with aldehydoacids or their alkali metal salts are suitable. When the preferred o-sulfobenzaldehyde is used, it is desirable that from 0.2 to 4.3% and preferably about 1% of the hydroxyls of the polyvinyl alcohol be acetalized with this aldehyde. This range defines a polymer having from 0.7 to 11% by weight of a group of the formula:

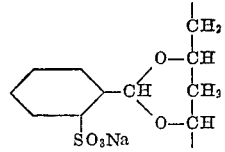

The preferred polyvinyl acetals of this invention have the following unit structure:

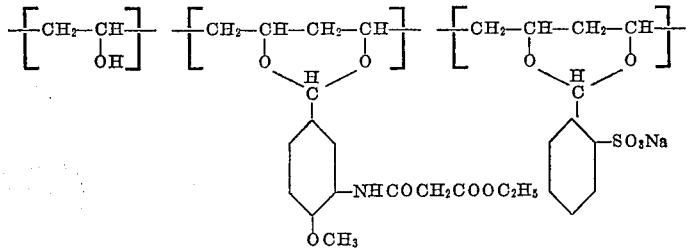

wherein from 1% to 7% of the hydroxyl groups are acetalized with 4-methoxy-3-carbethoxyacetamidobenzaldehyde and from 0.2% to 5% of the hydroxyl groups are acetalized with sodium o-sulfobenzaldehyde. This schematic representation shows only the relative amounts of the groups in the molecule. The color-former unit is not necessarily linked to the solubilizing unit but may be any place in the chain.

The synthetic hydroxyl polymers which can be used in the preparation of the color-forming polyvinyl acetals of this invention include hydroxyl polymers prepared by polymerizing a vinyl ester, e. g., vinyl acetate, vinyl propionate, vinyl benzoate, etc., alone or with minor proportions, i. e., 10% or less, of an unsaturated copolymerizable monomer, e. g., ethylene and isobutylene followed by partial or complete hydrolysis and, if desired, by further reaction to introduce minor proportions of other modifying groups, e. g., acetal, ester, or ether groups. Such hydroxyl polymers have a linear chain consisting mainly of

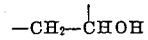

groups. Unmodified polyvinyl alcohol is the preferred hydroxyl polymer for forming the color-forming polyvinyl acetals of this invention.

The polyvinyl acetals of this invention can be advantageously used in the preparation of integrally masked color films of the type described in Jennings copending application Serial No. 22,300, filed April 21, 1948. As explained in the Examples III and IV the use of the polyvinyl acetal yellow color-formers containing a carbalkoxy-acetanilide group as the reactive nucleus instead of an acylacetamido group leads to greatly improved results. No unwanted yellow color is produced in the diazonium coupling so that the image gamma in the yellow image is not altered. Much better color balance and fidelity of reproduction are realized when the negative is converted to a positive.

As many widely different embodiments of this invention can be made without departing from the spirit and scope, it is to be understood that the invention is not to be limited except as defined by the claims.

What is claimed is:

1. The polymeric acetals which contain intralinear units of the formulae:

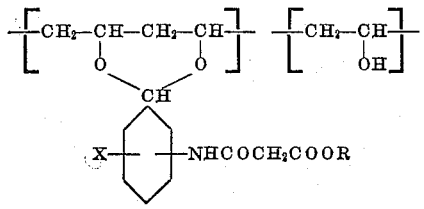

where R is an alkyl radical of 1 to 4 carbon atoms and X is a member taken from the group consisting of alkyl and alkoxy radicals of 1 to 4 carbon atoms.

2. The polymeric acetals which contain intralinear units of the formulae:

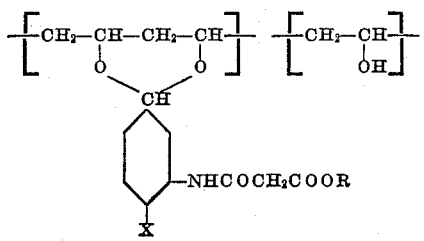

where R is an alkyl radical of 1 to 4 carbon atoms and X is a member taken from the group consisting of alkyl and alkoxy radicals of 1 to 4 carbon atoms.

3. The polymeric acetals which contain intralinear units of the formula:

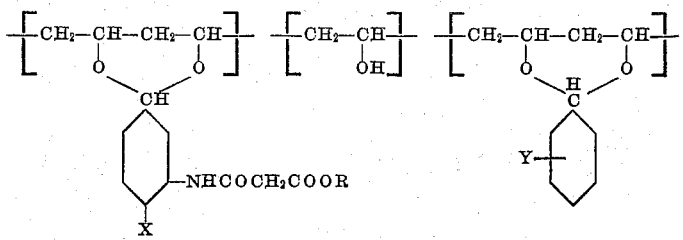

where R is an alkyl radical of 1 to 4 carbon atoms, X is a member taken from the group consisting of alkyl and alkoxy radicals of 1 to 4 carbon atoms and Y is a solubilizing radical taken from the group consisting of $SO_3H$, COOH, $SO_3M$ and COOM where M is an alkali metal.

4. The polymeric acetals which consist of intralinear units of the formulae:

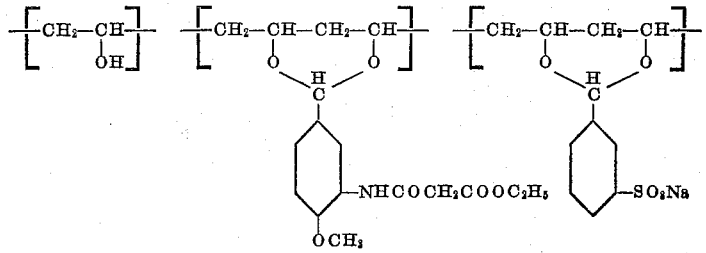

5. The polyvinyl alcohol acetals defined by claim 3 wherein from 1 to 7% of the hydroxyl groups are acetalized by the substituted carbalkoxyacetamidobenzaldehyde and 0.2 to 5% of the hydroxyl groups are acetalized by the other aldehyde.

JAMES OLIVER CORNER.

REFERENCES CITED

The following references are of record in the file of this patent:

UNITED STATES PATENTS

| Number | Name | Date |
|---|---|---|
| 2,310,943 | Dorough et al. | Feb. 16, 1943 |
| 2,397,864 | Jennings | Apr. 2, 1946 |
| 2,473,403 | Woodward | June 14, 1949 |